(12) United States Patent
Honda et al.

(10) Patent No.: US 7,889,370 B2
(45) Date of Patent: Feb. 15, 2011

(54) FACSIMILE MACHINE, METHOD OF TRANSMITTING A FACSIMILE AND METHOD OF RECEIVING THE SAME

(75) Inventors: Takashi Honda, Toyokawa (JP); Junichi Masuda, Toyokawa (JP); Shinichi Yabuki, Toyokawa (JP); Akihito Takada, Toyohashi (JP); Masazumi Ito, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1230 days.

(21) Appl. No.: 11/417,018

(22) Filed: May 4, 2006

(65) Prior Publication Data

US 2006/0262356 A1 Nov. 23, 2006

(30) Foreign Application Priority Data

May 19, 2005 (JP) .............................. 2005-147146

(51) Int. Cl.
G06F 3/12 (2006.01)

(52) U.S. Cl. ..................... 358/1.15; 358/1.16; 358/404; 358/442; 358/400; 379/100.01; 379/88.01

(58) Field of Classification Search .............. 358/1.15, 358/1.16, 404, 405, 442, 437, 400; 379/100.01, 379/204, 88.03
See application file for complete search history.

(56) References Cited

U.S. PATENT DOCUMENTS

| | | | |
|---|---|---|---|
| 5,778,163 A * | 7/1998 | Terajima | 358/1.14 |
| 6,266,159 B1 * | 7/2001 | Otsuka et al. | 358/405 |
| 6,876,469 B1 * | 4/2005 | Nakamura | 358/437 |
| 7,095,830 B1 * | 8/2006 | Hamaguchi | 379/93.02 |
| 7,557,945 B2 * | 7/2009 | Inada | 358/1.15 |
| 2002/0097434 A1 * | 7/2002 | Tsukioka | 358/1.16 |
| 2004/0125396 A1 * | 7/2004 | Burke | 358/1.13 |
| 2004/0246532 A1 * | 12/2004 | Inada | 358/402 |
| 2005/0111013 A1 * | 5/2005 | Maekawa | 358/1.1 |
| 2005/0243364 A1 * | 11/2005 | Sakai | 358/1.15 |
| 2008/0117473 A1 * | 5/2008 | Juliano | 358/405 |
| 2010/0123934 A1 * | 5/2010 | Ohba | 358/1.15 |

FOREIGN PATENT DOCUMENTS

JP 1-246961 A 10/1989

(Continued)

OTHER PUBLICATIONS

Notification of Reason for Refusal dated Oct. 2, 2007, and English translation.

*Primary Examiner*—Negussie Worku
(74) *Attorney, Agent, or Firm*—Buchanan Ingersoll & Rooney PC

(57) ABSTRACT

A facsimile machine comprises a connection for connecting an external storage device, a detection unit for detecting whether or not the external storage device is connected to said connection, a switching unit that switches confidential fax transmitting function to enable if the external storage device is connected to the connection and switching the confidential fax transmitting function to disable if it is not connected, a display unit that displays names of files of image data that can be transmitted by facsimile from the image data stored in the external storage device connected to the connection, a file selection unit that selects based on a user's instruction a file to be transmitted, from the displayed files, and a transmission unit that transmits the image data of the selected file by the confidential fax transmitting function.

17 Claims, 11 Drawing Sheets

FOREIGN PATENT DOCUMENTS

| | | |
|---|---|---|
| JP | 5-143253 | 6/1993 |
| JP | 5-167639 A | 7/1993 |
| JP | 9-261486 A | 10/1997 |
| JP | 10-42148 | 2/1998 |
| JP | 2001-69327 A | 3/2001 |
| JP | 2002-190877 A | 7/2002 |
| JP | 2003-182187 | 7/2003 |
| JP | 2004-48214 A | 2/2004 |
| JP | 2004-355244 A | 12/2004 |
| JP | 2005-103867 A | 4/2005 |

* cited by examiner

FACSIMILE MACHINE, METHOD OF TRANSMITTING A FACSIMILE AND METHOD OF RECEIVING THE SAME

This application claims priority to Japanese Patent Application No. 2005-147146 filed on May 19, 2005, the entire disclosure of which is incorporated herein by reference in its entirety.

BACKGROUND OF THE INVENTION

1. Field of the Invention

The present invention relates to a facsimile machine with a confidential function, a method of transmitting a facsimile and a method of receiving the same.

In this specification, a "facsimile" is also referred to as a "fax".

2. Description of the Related Art

The following description sets forth the inventor's knowledge of related art and problems therein and should not be construed as an admission of knowledge in the prior art.

Some facsimile machines comprise a confidential function. When such the function is used, received image data is once stored in an internal memory in a facsimile machine without being printed out immediately.

On the one hand, a user who wishes to use the confidential function should register in advance his/her authentication data such as his/her own personal identification number, etc. Then, when that user enters his/her authentication data, and registered data matches the entered data, and if there is any received image for the user who entered, the image data stored in the internal memory of the machine can be printed out. Therefore, higher confidentiality of the received image data can be maintained than with the case of normal fax reception.

In addition, in Japanese Unexamined Patent Publication No. 5-143253, an image forming apparatus is disclosed wherein when a request to output classified data, etc. is made, an authentication data such as an identification number is entered from an operation panel provided on the machine, and thereby this classified data is printed and outputted. In this image forming apparatus, when a user who requested for printing and output of the classified data is beside the image forming apparatus, a sheet(s) printed based on the classified data is (are) discharged.

In addition, in Japanese Unexamined Patent Publication No. 2003-182187, a technology is disclosed wherein a user ID is specified in a card, the card on which the user ID is stored is connected to an image forming apparatus, and then printing and outputting takes place.

However, in a conventional facsimile machine having the confidential function described above, although higher confidentiality of received image data can be maintained than with the case of normal fax reception, originals are used when image data is transmitted and received image data is discharged in the form of printouts, the originals or printouts are in danger of being seen by a third person, and thus ensuring confidentiality was more demanded in this respect.

In addition, the technologies described in the aforementioned respective publications were also in danger of being seen by a third person.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can provide a facsimile machine with a confidential function wherein confidentiality is enhanced by eliminating the risk that an original or printout may be seen by a third person when a confidential fax is transmitted or when received data of a confidential fax is output.

Among other potential advantages, some embodiments can provide a method of transmitting a facsimile with enhanced confidentiality by eliminating the risk that a confidential fax may be seen by a third person as an original when it is transmitted.

Among other potential advantages, some embodiments can provide a method of receiving a facsimile with enhanced confidentiality by eliminating the risk that a confidential fax may be seen as a printout by a third person when it is received.

According to a first aspect of a preferred embodiment of the present invention, a facsimile machine comprises a connection for connecting an external storage device, a detection unit for detecting whether or not the external storage device is connected to the connection, a switching unit that switches a confidential fax transmitting function to enable if the external storage device is connected to the connection, and switches the confidential fax transmitting function to disable if it is not connected, a display that displays names of files of image data that can be transmitted by facsimile from image data stored in the external storage device connected to the connection, a file selection unit that selects, based on a user's instruction, a file to be transmitted from the files displayed on the display, and a transmission unit that transmits, by the confidential fax transmitting function, image data of the file selected by the file selection unit.

According to a second aspect of a preferred embodiment of the present invention, a facsimile machine comprises a connection for connecting an external storage device, an internal memory, a detection unit for detecting whether or not the external storage device is connected to the connection, a receiving unit for receiving image data of a confidential fax, a save unit that saves image data of a received confidential fax into the internal memory when the external storage device is not connected to the connection, and a transfer authorizing unit that authorizes a transfer to the external storage device of the received data of the confidential fax stored in the internal memory, when it is detected that the external storage device is connected to the connection.

According to a third aspect of a preferred embodiment of the present invention, a facsimile machine comprises a connection for connecting an external storage device, a detection unit for detecting whether or not the external storage device is connected to the connection, a switching unit that switches a confidential fax receiving function to enable if the external storage device is connected to the connection, and switches the confidential fax receiving function to disable if it is not connected, a receiving unit for receiving image data of a confidential fax, and a save unit that saves the image data of the received confidential fax into the external storage device.

According to a fourth aspect of a preferred embodiment of the present invention, a method of transmitting a facsimile comprises steps of: detecting whether or not an external storage device is connected to a connection for connecting the external storage device, switching a confidential fax transmitting function to enable if the external storage device is connected to the connection and switching the confidential fax transmitting function to disable if it is not connected, displaying names of files of image data that can be transmitted by facsimile from image data stored in the external storage device connected to the connection, selecting based on a user's instruction a file to be transmitted from the displayed files, and transmitting image data of the selected file by the confidential fax transmitting function.

According to a fifth aspect of a preferred embodiment of the present invention, a method of receiving a facsimile comprises steps of: detecting whether or not an external storage device is connected to a connection for connecting the external storage device; receiving image data of a confidential fax; saving image data of a received confidential fax into an internal memory if the external storage device is not connected to the connection, and a step of allowing the received data of the confidential fax stored in the internal memory to be transferred to the external storage device when it is detected that the external storage is connected to the connection.

According to a sixth aspect of a preferred embodiment of the present invention, a method of receiving a facsimile comprises steps of: detecting whether or not an external storage device is connected to a connection for connecting the external storage device; step of switching a confidential fax receiving function to enable when the external storage device is connected to the connection, and switching the confidential fax receiving function to disable when it is not connected, step of receiving image data of a confidential fax, and step of saving the image data of the received confidential fax into the external storage device.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[Overall Configuration of MFP]

Figure 1:
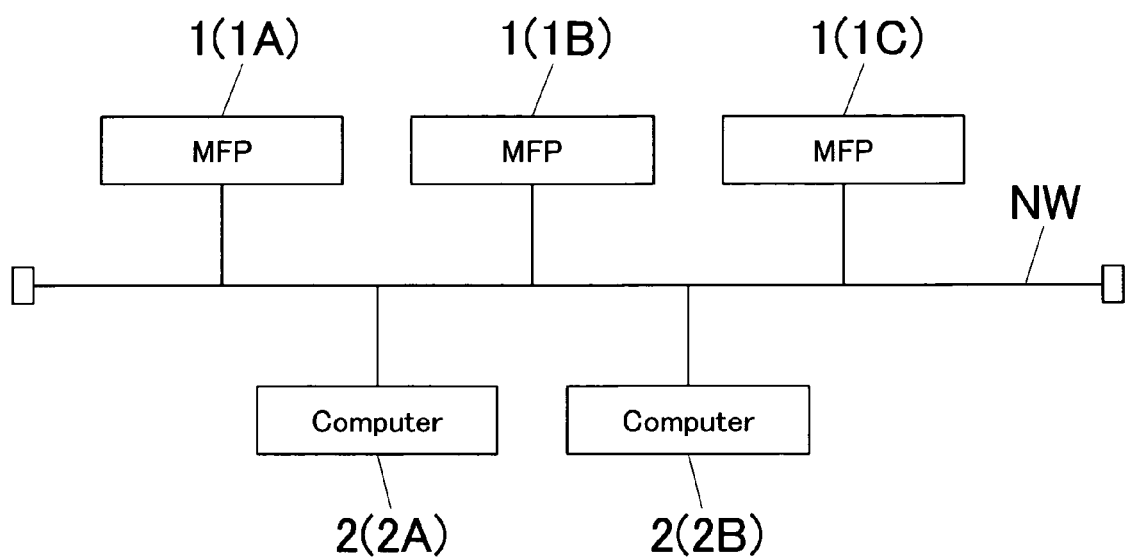
FIG. 1 is a perspective view of an exterior appearance of an MFP to which a facsimile machine according to one embodiment of this invention applies.

FIG. 1 is a perspective view showing an MFP as a facsimile machine according to one embodiment of this invention.

Figure 2:
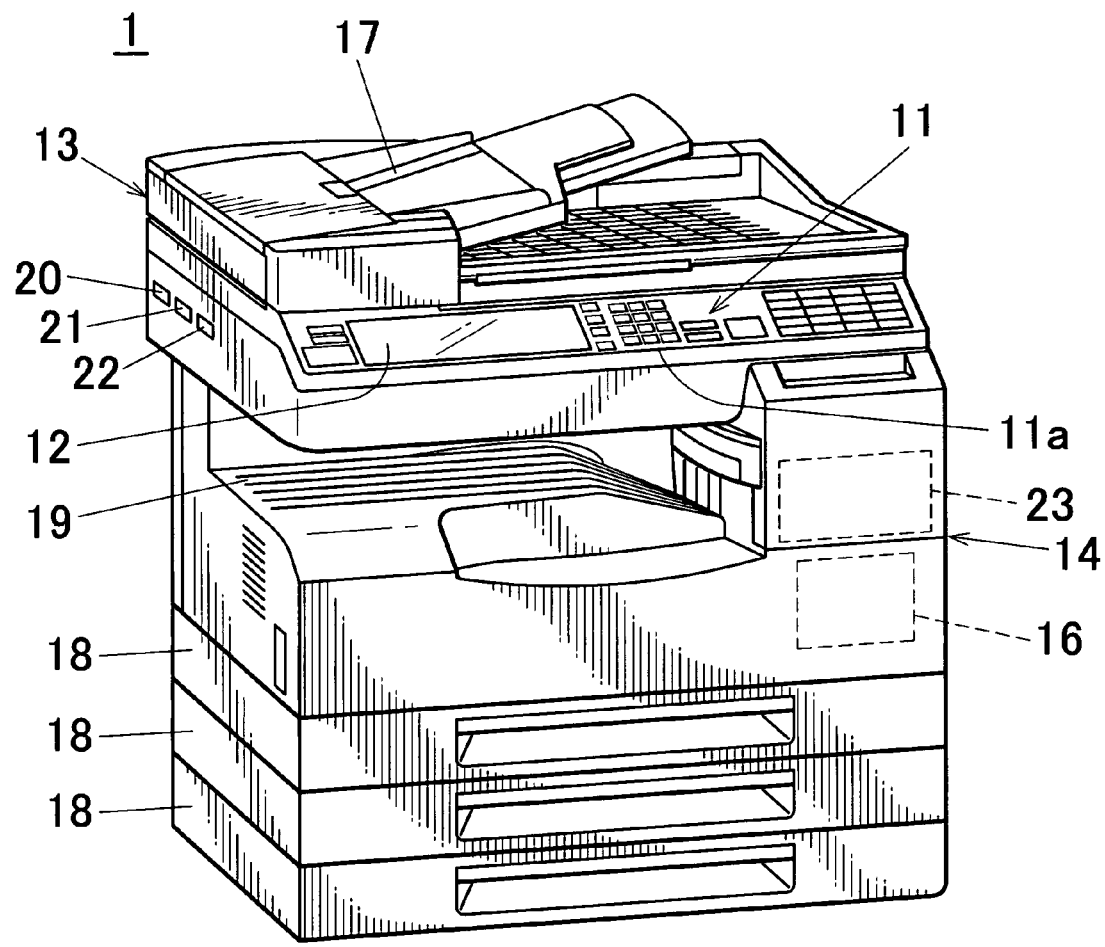
FIG. 2 is a block diagram showing the same MFP network environment.

In FIG. 1, the MFP1 is a digital compound machine having an original function, a print function, a facsimile function, a scanner function, etc., and able to transmit/receive data to/from a user terminal, etc. by way of a network NW (FIG. 2).

The MFP 1 has three jacks, i.e., first, second, and third jacks 20, 21, 22 as connections to which a plurality of (3, in this case) external devices of USB (Universal Serial Bus) standard, and when external devices having USB interfaces such as USB memories 320, 321, 322 (FIG. 3), being external storage devices, are connected to these jacks 20, 21, 22, two-way data transmission/reception is enabled between the external device and MFP 1. Hereinafter, these jacks 20, 21, 22 are referred to as USB jacks.

The MFP 1 comprises an operation panel 10, the operation panel 10 having a plurality of keys 11a, an operation unit 11 that receives input of data by user operation, such as various instructions, characters, digits, etc., to the plurality of keys 11a, and a display 12 consisting of a liquid crystal, etc. that displays instruction menu to a user or information on acquired images.

In addition, the MFP 1 comprises a scanner unit 13 for optically reading an original and acquiring image data, and a printer unit 14 for printing images on a record sheet based on the image data.

In addition, on the top face of the MFP1 is arranged a feeder unit 17 for feeding an original to the scanner unit 13, in the lower part is arranged a paper feeder unit 18 for supplying record sheets to the printer unit 14, and in the central part is arranged a tray 19 into which record sheets on which images are printed by the printer unit 14 are discharged, respectively. Furthermore, in the interior of a MFP1 body are provided a communications unit 16 for transmitting/receiving image data to/from an external device through a network NW and a memory 313 for storing image data, etc.

In addition, the MF1 has a network interface, and the communications unit 16 is connected to the network NW through the network interface so as to transmit/receive various types of data to/from the external device.

The display 12 is used for a variety of displays including a list of destinations of data transmission, a list of files in the USB memories 320 to 322, and a select display of whether or not to store received data in the USB memories 320 to 322. In addition, the operation unit 11 is used in a variety of inputs including selections of destinations by user. They function as essential parts of user interface.

The scanner unit 13 optically reads from an original such image information as photographs, characters, pictures, etc. and acquires image data. Acquired image data (density data) is converted into digital data in an image processing unit (not shown), sent to the printer unit 14 or communication unit 16 after being subject to various well-known image processing, and served for printing of images or transmission of data. It may also be stored in a memory unit such as a hard disk, etc., for later use.

The printer unit 14 prints on record sheets image data acquired by the scanner unit 13, image data received by the communications unit 16 from the external device, or image data saved in the memory 313.

The communications unit 16 not only conducts transmission and reception of fax data by way of a dial-up line, but also transmits and receives data, by electronic mail, etc., via a network such as LAN and Internet, to and from the external unit connected to the network NW.

With this, the MFP1 also has capability as a facsimile device for conducting normal fax communication as well as that as a transmission/reception terminal of e-mail. Therefore, it can transmit/receive various image data, as an attachment to e-mail. In addition, although network communications to be carried out by the MFP 1 may be wired or wireless, a wired communications method is used in the shown example.

[Overview of Network]

FIG. 2 illustrates an example of network connection of the MFP1.

In FIG. 2, the network NW comprises personal computers (hereinafter also referred to as PCs) 2 (2A, 2B . . . ) as a plurality of external devices (terminals) that request printing as a job, and a plurality of MFP1 (1A, 1B, 1C . . . ) that execute the job. Now each MFP1 has a multi-job function.

The multi-job function is the capability of digitally processing image data read by means of an image reader, etc., and using it in image formation or the capability of performing image formation by means of the image data transmitted from an external terminal, such as the PC 2, connected to the image forming apparatus, in an image forming apparatus, such as a digital copier, a printer, etc., capable of forming images by using digitized image data. In addition, the capability of acquiring image data while forming images is also a part of the multi-job function.

The image forming apparatus with the multi-job function serially performs image formation on a job basis, by treating image formation with image data that has been obtained from a stack of originals read from the image reader or image formation with image data transmitted from a PC, respectively, as one job.

In other words, while image data obtained by reading originals or image data transmitted from a PC is associated with respective job identifiers (hereinafter referred to as a "job ID") and accumulated in an image memory, job IDs will be registered in a predetermined control table in the order of the respective jobs issued to the image forming apparatus. Then, image formation takes place in the order of the job IDs registered in the table.

[Electrical Configuration of MFP1]

Figure 3:
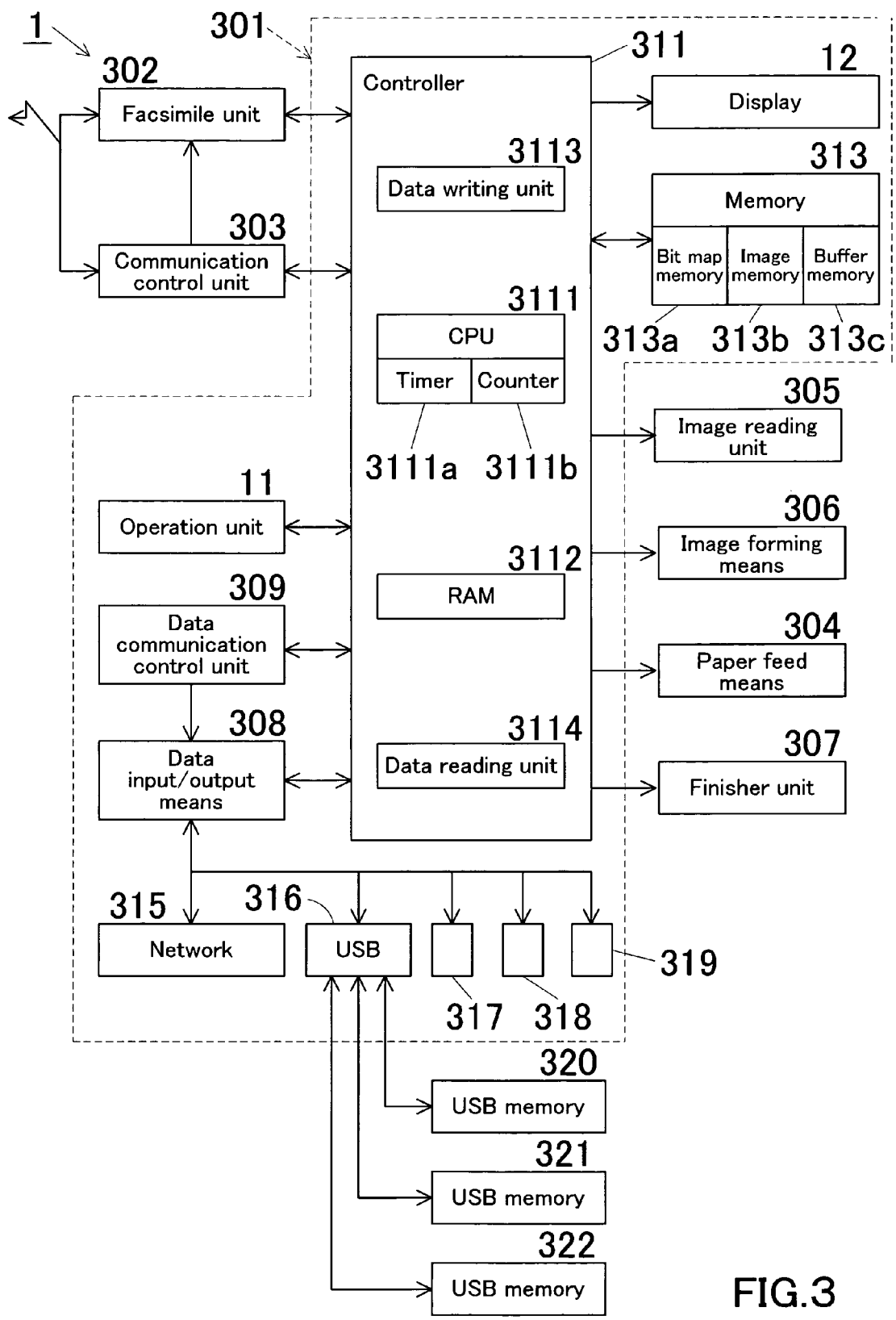
FIG. 3 is a block diagram showing the electrical configuration of the same MFP.

FIG. 3 is a block diagram showing the electrical configuration of the MFP1.

In FIG. 3, the MFP1 has an information processing unit 301, a facsimile unit 302, a communication control unit 303, a paper feeding unit 304, an image reading unit 305 comprising the scanner unit 13, an image forming unit 306 comprising the printer unit 14, and a finisher unit 307. The facsimile unit 302 and communication control unit 303 comprise the communication unit 16.

The information processing unit 301 has a data input/output unit 308, a data communication control unit 309, an operation unit 11, a control unit 311, a memory 313, and a display 12, etc. The information processing unit 301 is designed to delete a job saved in the image memory 313$b$, control outputs, etc.

The control unit 311 has a CPU 3111, a RAM 3112, an image data writing unit 3113, an image date reading unit 3114, etc. To this control unit 311 is connected the data input/output unit 308 to be used when inputting/outputting a job.

The CPU 3111 exercises control of the entire MFP1, such as execution of facsimile transmission and reception of image data, driving of the scanner unit 13 or the printer unit 14, control of display of the display 12, wherein it has a timer 3111$a$ for measuring elapsed time since the facsimile function enters the dial wait state and a counter 3111$b$ for counting the number of redials executed.

In this embodiment, the CPU 3111 further has the following functions. In other words, it has the capability of detecting that USB memories 320 (321) (322) are connected (mounted) to the USB jacks 20 (21) (22), the capability of determining whether a file that can be transmitted by confidential fax transmission is stored in USB memories 320, (321), (322), when the USB memories 320 (321), (322) are connected to the USB jacks 20 (21) (22), or the capability of making other determinations.

The control and the capabilities of the CPU 3111 as described above are fulfilled through execution of a program saved in a program saving unit (not shown).

The RAM 3112 functions as a working area when CPU 3111 operates.

In the data input/output unit 308 are provided a plurality of interface (I/F) terminals such as a LAN (Local Area Network) terminal 315 of a TCP/IP based network, an USB terminal 316, a Centronics terminal 317, a serial interface terminal 318 and/or a JTAG terminal 319, etc.

The data input/output unit 308 is designed to have the control unit 311 to read out, write, and delete data when it is connected to the network terminal 305, the USB terminal 316, the Centronics terminal 317, the serial interface terminal 318 or the JTAG terminal 319.

The memory 313 comprises a bit map memory 313$a$ that stores received image data developed to print on a sheet at the image forming unit 306, a buffer memory 313$c$ for conveying to the image memory 313$b$ image data read by the scanner unit 13 for transmission, and an image memory 313$b$ that compresses and stores any of each image data of transmission/reception conveyed from the buffer memory 313$c$. In the memory 313, copying between memories is possible.

In this embodiment, as described above, a plurality of jacks are provided as the USB terminal 316, to each of which the USB memories 320, 321, 322 can be connected. In addition, the control unit 311 can simultaneously execute reading of each storage information to the plurality of USB memories 320, 321, 322 and writing of the information to the respective USB memories 320, 321, 322. The reading of information is executed by the data reading unit 3114 of the control unit 311, while the writing of information is executed by the data writing unit 3113.

The facsimile unit 302 executes fax transmission and reception of image data, and the fax transmission and reception includes confidential fax transmission and reception, in addition to normal fax transmission and reception. In the following, the confidential fax transmission and the confidential fax reception may simply be referred to as the confidential transmission and the confidential reception.

The communication control unit 303 has start of a switch, a repair unit, a detection unit of a call signal, a determination unit, etc., that determines based on a signal from a destination whether or not transmission is possible, etc., and is a necessary component for operating the function of the facsimile unit 302.

[Operation Panel]

Figure 4:
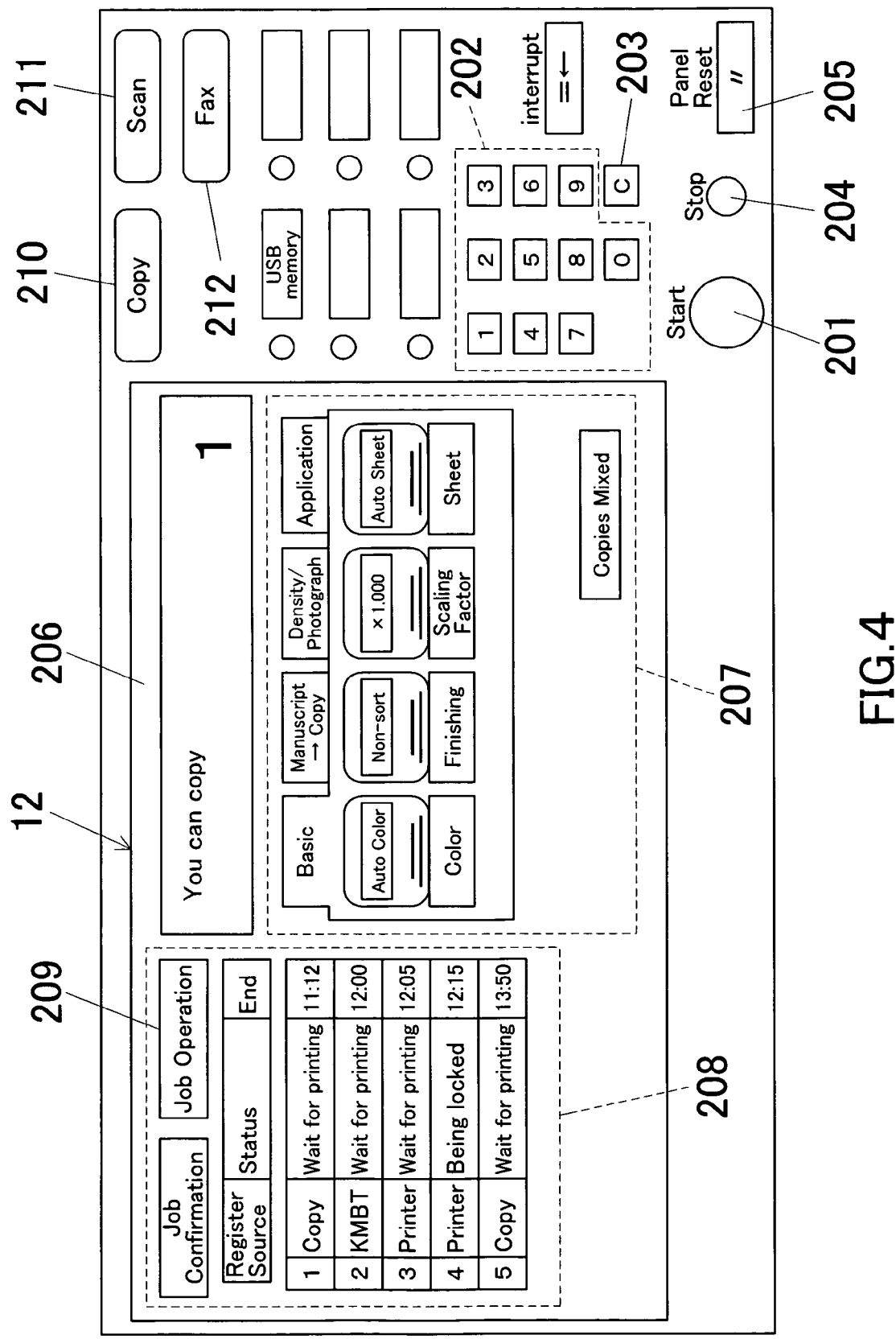
FIG. 4 is an illustration of a display screen of an operation panel.

FIG. 4 is a top view showing configuration of an operation panel 10 in MFP1.

In FIG. 4, Start key 201 is used to start such operations as copy/print/facsimile transmission/e-mail, FTP transmission, etc. A numeric key 202 is used to enter a numeric value such as the number of copies, etc. Clear key 203 is used to clear any entered numeric value and discard image data accumulated in the image memory 313b, etc.

Stop key 204 is used to give an instruction to stop the copy/scan operation. Panel Reset key 205 is used to discard set mode of operation and job.

In addition, the display 12 performs display of various modes or other displays, and to the surface of the display a touch panel 206 is attached. The touch panel 206 enables a user to execute various settings or selections according to display content of the display 12.

Usually, in the setting screen area 207 in the touch panel 206, are provided buttons for basic/applicable settings that are to be executed when the copy or fax transmission operation takes place. When each of the buttons is pressed, the hierarchy screen for performing detailed setting thereof appears.

In a job information screen area 208 of the touch panel 206, information on jobs that are then given to the MFP1 is displayed. The display is arranged in the order of jobs to be executed. When erase or change operation, etc., is performed to a specific job, Job No. button of a job subjected to operation is pressed after Operate Job button 209 is selected. Then, those operations let the Operate Job screen appear, enabling any operation to a specific job.

Copy key 210, Scan key 211, and Fax key 212 are selection keys to set in which of copy/scanner/facsimile operation mode to operate the MFP1.

When Copy key 201 is pressed, the MFP1 is enabled to work as a copier. In this condition, the scanner operation and the fax operation cannot be executed.

Then, in the setting screen area 207 of the touch panel 206, a display for making various settings for the copy operation appears. After various settings are complete, an original is set and Start key 201 is pressed. Then, the copy operation begins. In addition, when Scan key 211 is pressed, MFP1 will be a scanner. In this condition, the copy operation and the fax operation are disabled.

Then, in the setting screen area 207 of the touch panel 206, a display for performing various settings for the scan operation appears. After the settings end, the scan operation starts when an original is set and Start key 201 is pressed, In addition, when Fax key 212 is pressed, the MFP1 will be a facsimile. In this condition, neither the copy operation nor the scanner operation can be executed.

Then, in the setting screen area 207 of the touch panel 206, a display for performing various settings for fax operation appears. After the settings end, an original will be set or the USB memory will be set and Start key 201 is pressed, thus fax transmission starts.

In addition, the Copy key 210, Scan key 211, and Fax key 212 are exclusive operation, and when any one of them is selected, the others will automatically become unselected.

In addition, when printing is done by using the MFP1 from PC2, this driver software for printer control will be installed in PC2, and thus various settings for printing can be done at the driver screen. Thus, there will be no need of displaying the printer setting screen on the operation panel 10 of the MFP1 and the print switching key.

Figure 5:
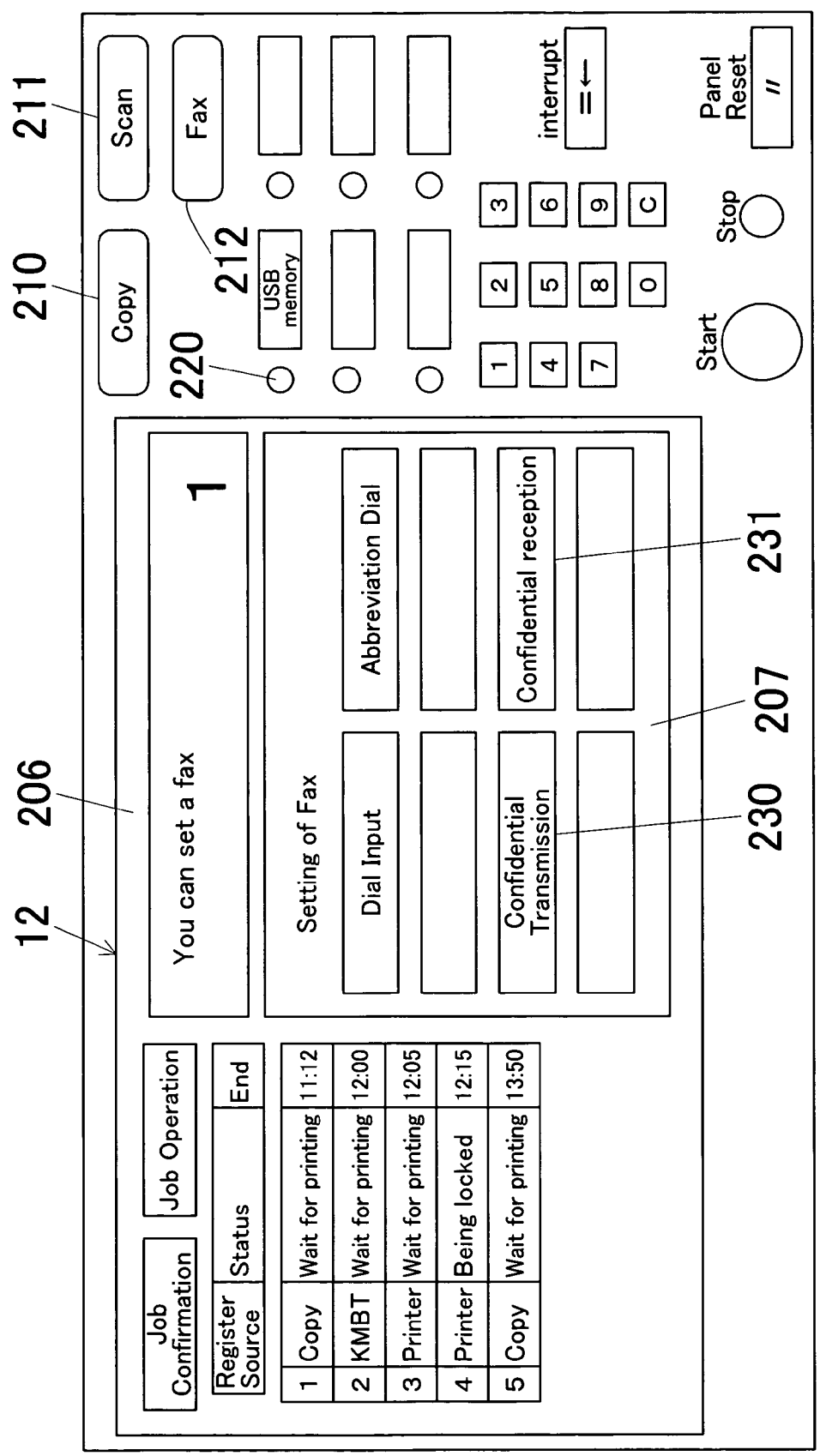
FIG. 5 is a setting screen of a facsimile.

FIG. 5 shows a screen for the operation panel to be displayed when the fax function is selected in the present embodiment.

When Fax key 212 in FIG. 3 is pressed, in the setting screen area 207 of the display 12, the display for performing various settings to the facsimile operation including the confidential transmission key 230 and confidential reception key 231 appears.

Then, the confidential transmission key 230 for confidentially transmitting data is displayed or enabled to be pressed, only when, for instance, the USB memory 320 is attached to at least any of the USB jacks (e.g., USB jack 20) of the MFP1, and LED 220 indicating detection result of loading of the USB memory is turned ON. In other words, the confidential transmission function is enabled. In addition, if the USB memory is not attached, Confidential Transmission key 230 is not displayed or disabled to be pressed. In other words, the confidential transmission function is disabled.

Figure 6:
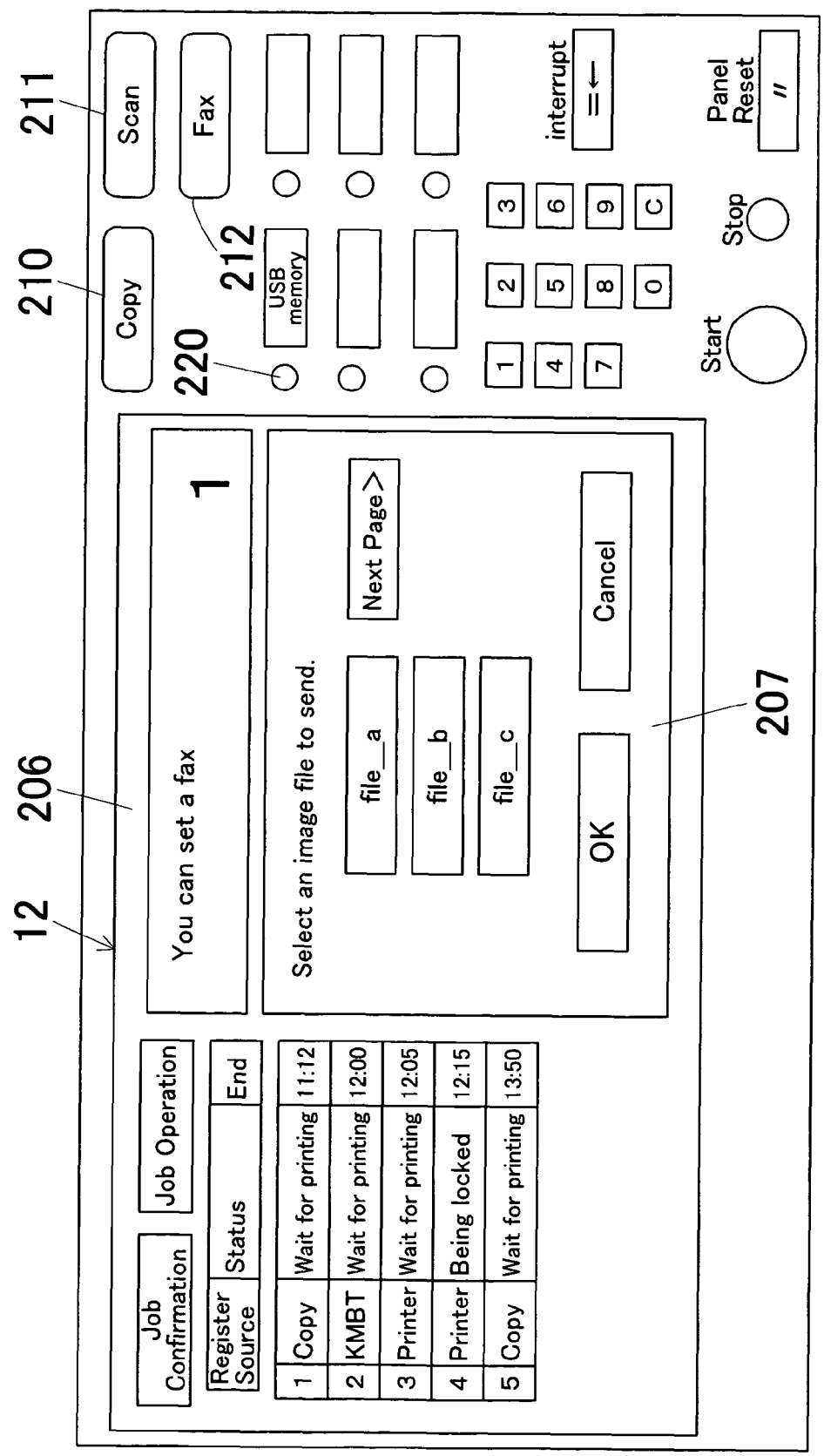
FIG. 6 is a screen listing image data file names in a USB memory.

When Confidential Transmission key 230 is pressed and an image data file exists in the USB memory 320, as shown in FIG. 6, in the setting screen area 207 of the touch panel 206, names of image data files existing in the USB memory 320 are listed, thus enabling a user to select a desired file. In addition, in the case the number of files existing in the USB memory 320 exceeds that of this hierarchy screen display, the remaining files can be displayed when "Next Page" key is pressed. If "OK" key is pressed on this screen, MFP1 starts the operation of reading image data of a specified file.

Figure 7:
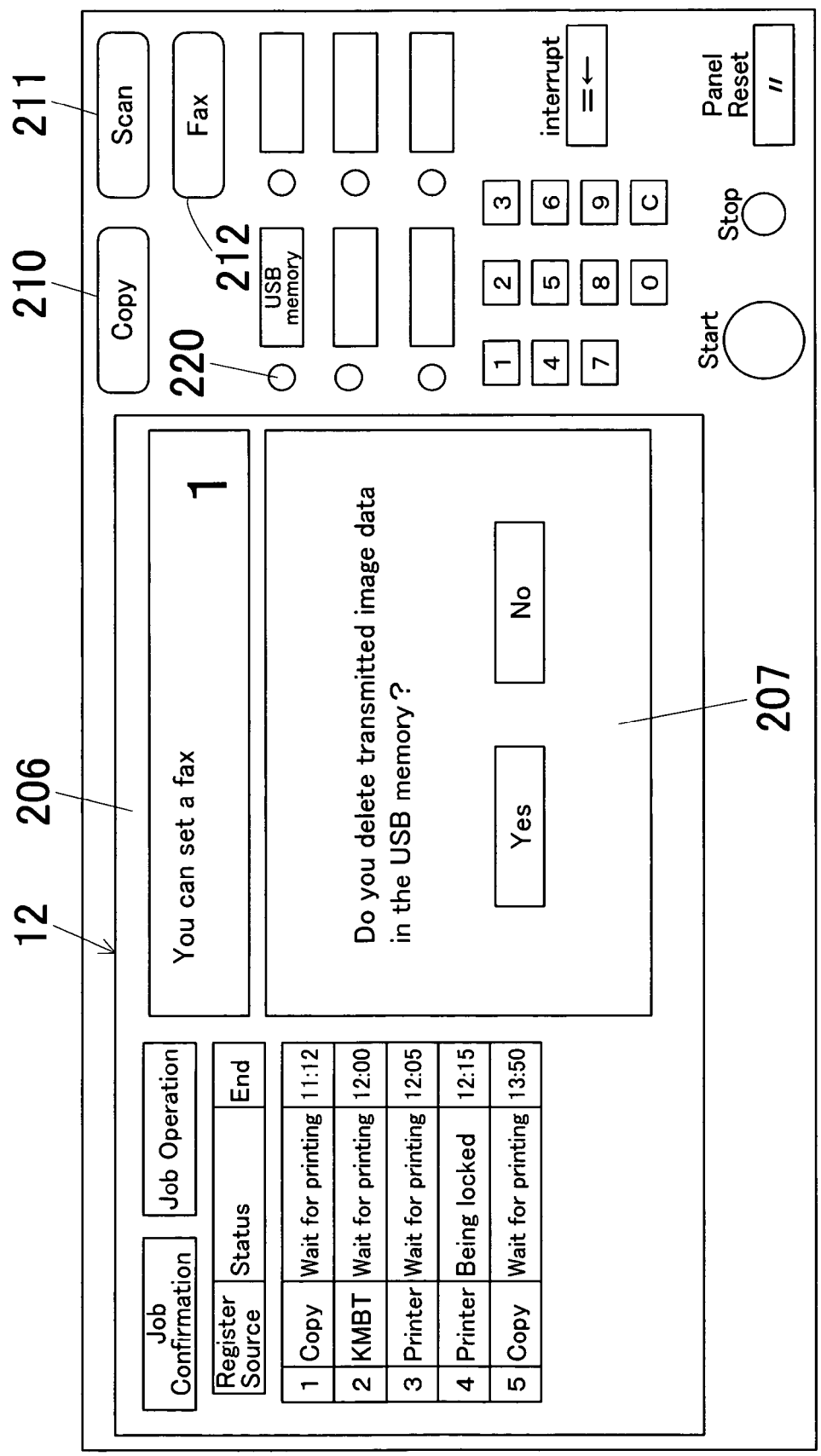
FIG. 7 is a screen for selecting whether or not to delete confidential transmitted data.

When reading of the image data successfully ends, then, the display prompting for entry of a fax number of a destination of the data appears. Furthermore, after the data transmission completes, as shown in FIG. 7, the screen for selecting whether or not to delete the image data file for which confidential fax transmission was executed from the USB memory 320 appears. Now, if "Yes" is selected, the transmitted image data file will be deleted from the USB memory 320.

Figure 8:
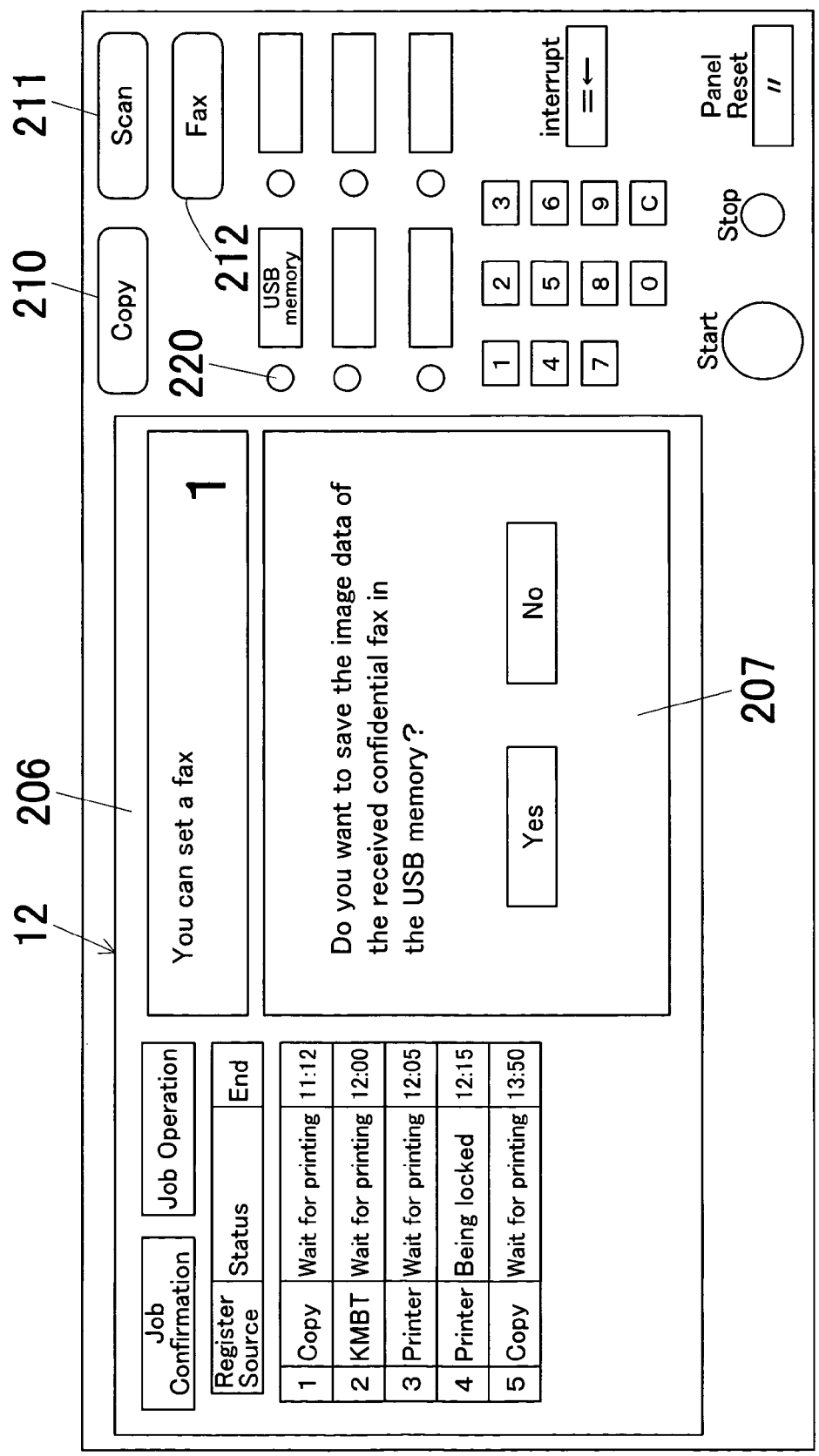
FIG. 8 is a screen for selecting whether or not to save confidential received data in the USB memory.

In addition, Confidential Reception key 231 of FIG. 5 is displayed or enabled to be pressed only when confidential reception data exists in the memory 313 of MFP1 and, for instance, the USB memory 320 is attached to at least any of the USB jacks (e.g., USB jack 20) of MFP1, and when LED 220 showing detection result of loading of the USB memory 320 is turned ON. If Confidential Reception key 231 is pressed in enabled state, transfer of received data in the memory 313 to the USB memory is allowed, and a confirmation screen as shown in FIG. 8 appears. Now if "Yes" is selected, confidential received data that is temporarily stored in the memory 313 of the MFP1 will be saved in the USB memory 320.

These processes are now explained with reference to a flow chart. In addition, these processes are executed when CPU 3111 of the control unit 311 runs the program saved in a storage medium (not shown) such as ROM, etc.

[Confidential Transmission Process]

Figure 9:
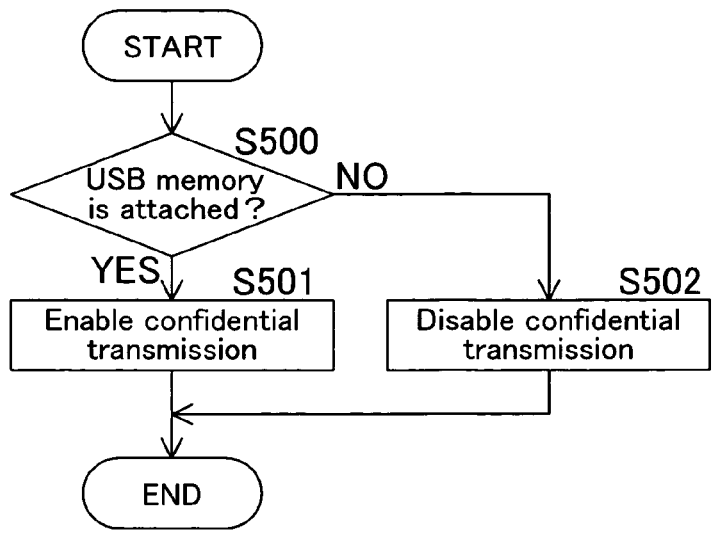
FIG. 9 is a flow chart showing determination processing of whether to enable or disable a confidential transmission key.

FIG. 9 shows a flow chart of processes in confidential transmission.

In step S500, it is determined whether or not at least any of the USB memories 320 to 322 is attached to at least any of the USB jacks 20 to 22. If it is attached (YES in step S500), in step S501, Confidential Transmission key 230 appears in the fax setting screen of FIG. 5 that is displayed when Fax key 212 is pressed, or Confidential Transmission key 230 is enabled.

On the one hand, if the USB memory is not attached (NO in step S500), in step S502, Confidential Transmission key 230 is not displayed or disabled.

Figure 10:
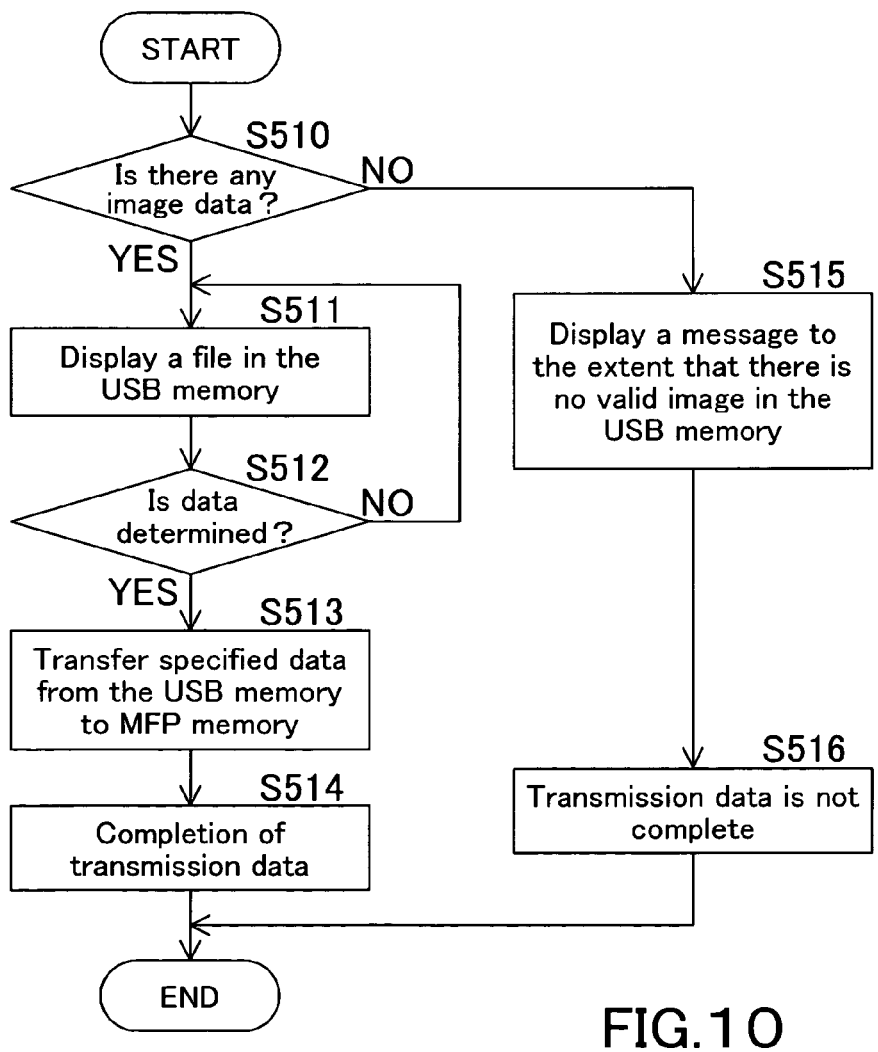
FIG. 10 is a flow chart of when confidential transmission is executed.

Then, FIG. 10 shows processes when Confidential Transmission key 230 that is enabled to be pressed is pressed by the user.

First, in step S510, it is determined whether or not any image data file that can be transmitted exists in the attached USB memory 320, for instance. As a result of the determination, if the image data file exists in the USB memory (YES in step S510), in step S511, names of image data files subject to transmission are listed. Then, if files the number of which exceeds the number of files that can be displayed on the display screen exist, they can be displayed on more than one page.

In step S512, determination of the image data file to be confidentially transmitted is waited, and if the image data is determined based on the user's selection (YES in step S512), in step S513, the image data in the determined file is transferred from the USB memory 320 to the memory 313 of MFP1, and in step S514, the transmitted image data becomes ready.

On the other hand, if no image data file that can be transmitted exists in the attached USB memories 320 to 322 (NO in step S510), in step S515, in the message area 207 of the touch panel 206, a message to the extent that "no image data file exists" appears. At this moment, MFP1 is in the device condition wherein the transmitted image data is not ready, and enters wait state for transmitted image (Step S516).

Figure 11:
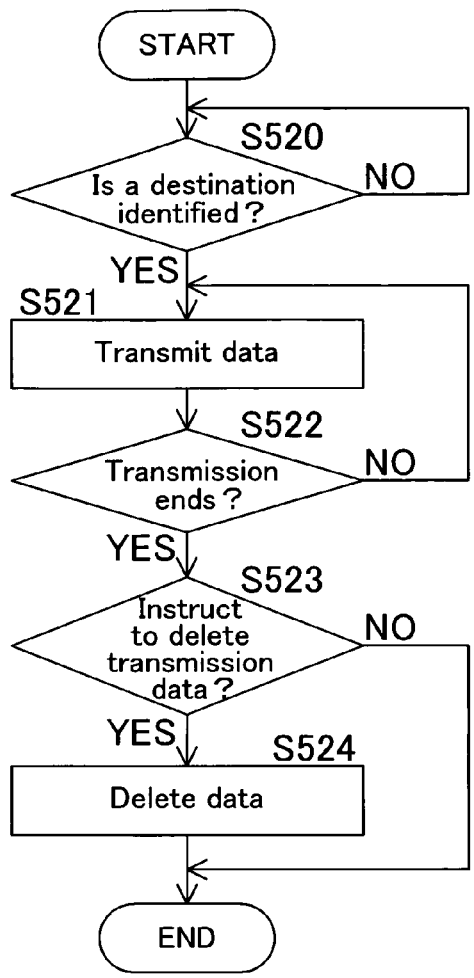
FIG. 11 is a flow chart showing a data deletion processing after confidential transmission.

FIG. 11 shows the processes if confidential transmission took place.

In step S520, it is waited that a destination of read image data is identified. When a telephone number of the destination is identified (YES in step S520), in step S521, data transmission starts. Then, in step S522, it is determined whether or not transmission of all data is complete. If completion of the transmission is confirmed (YES in step S522), in step 523, the screen appears in the message area 207 of the touch panel 206 wherein user selection is waited as to whether or not to delete the data in the USB memory 320 that was subject to transmission.

If the user selects to delete (YES in step S523), in step 524, CPU 3111 executes deletion of the file in the USB memory that was subject to transmission. In the case the user does not select to delete (NO in step S523), that file remains in the USB memory without being deleted.

Thus, in this embodiment, as image data of a file specified by the user is automatically transmitted confidentially, among files stored in the USB memory 20 attached to the USB jacks 20 to 22, it becomes unnecessary to have originals in confidential transmission, and image data that the user wishes to send has only to be stored in the USB memory. This can eliminate the risk of image data that is to be transmitted being seen by a third person, thus ensuring higher confidentiality, and achieving excellent security.

In addition, as transmitted data can be deleted based on a user's instruction, it is possible to maintain higher confidentiality.

[Confidential Reception Process]

Figure 12:
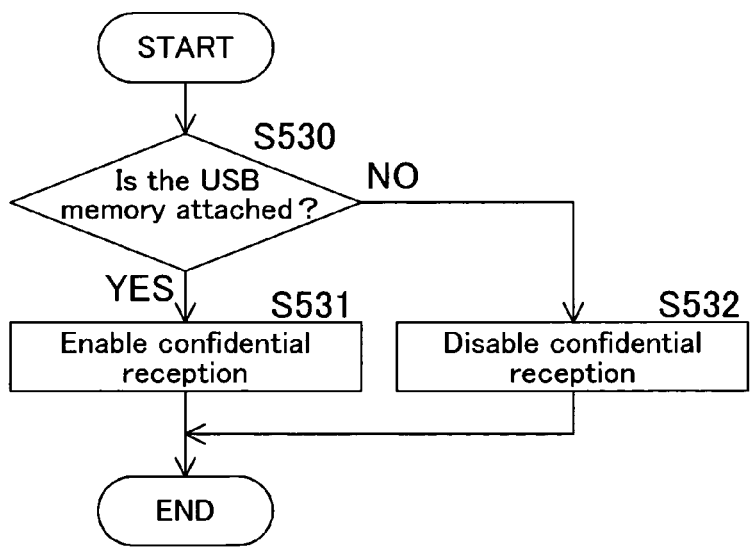
FIG. 12 is a flow chart showing determination processing of whether to enable or disable a confidential reception key.

FIG. 12 is a flow chart showing processes in confidential reception.

In step S530, it is determined whether or not at least any of the USB memories 20 to 22 is attached at least any of the USB jacks 320 to 322. If it is attached (YES in step S530), in step S531, Confidential Reception key 231 appears in the fax setting screen of FIG. 5 that appears when Fax key 212 is pressed or Confidential Reception key 231 is enabled.

On the one hand, if the USB memory is not attached (NO in step S530), in step 532, Confidential Reception key 231 is not displayed or disabled.

Figure 13:
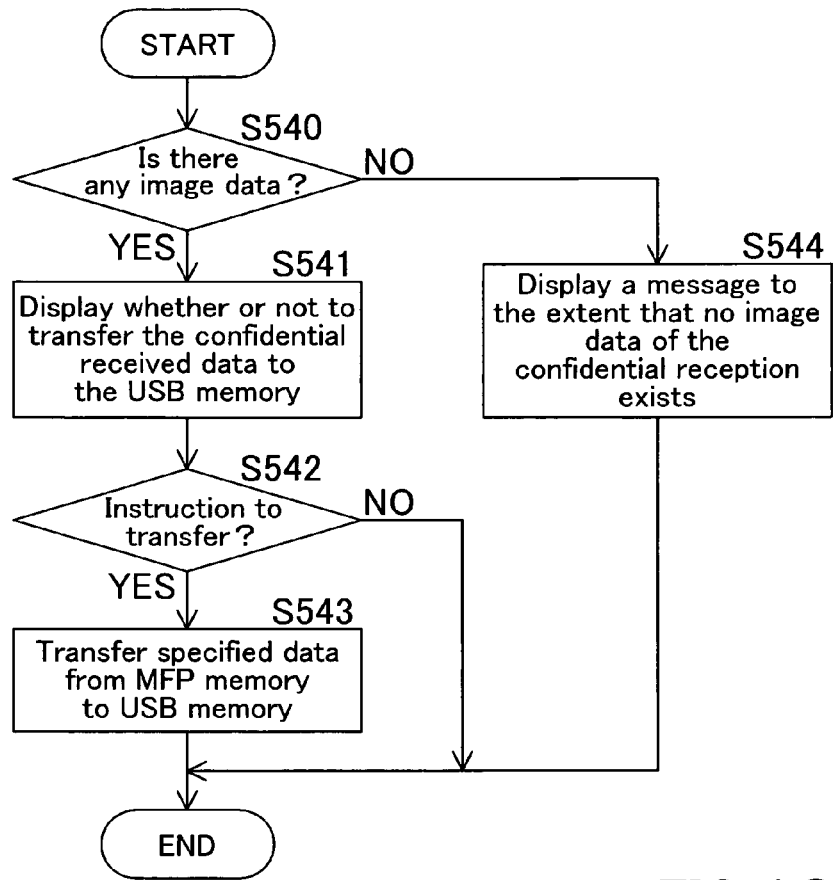
FIG. 13 is a flow chart showing transfer processing of the confidential received data to the USB memory.

Then, FIG. 13 shows the processes when the user presses Confidential Reception key 231 that is enabled to be pressed.

First, in step S540, it is determined whether or not any confidential received image data exists in the memory 313 in MFP1. If the confidential received data exists in the memory 313 (YES in step S540), in step S541, the screen (as shown in FIG. 8) waiting for a user's selection as to whether or not to transfer that data from the memory 313 of MFP1 to the USB memory appears in the message area 207 of the touch panel 206.

Then, in step S542, it is determined whether or not the user has selected to transfer the confidential received data to the USB memory. If the user has selected (YES in step S542), in step S543, the confidential received data is transferred from the memory 313 of MFP1 to the USB memories 320 to 322. If the transfer is not selected (NO in step S542), the process ends.

On the other hand, if no confidential received data existed in the memory 313 of MFP1 (NO in step S540), in step S544, in the message area 207 of the touch panel 206, a message to the extent that "there is no confidential received data" appears and the process ends.

Thus, if the USB memory is not attached, the confidential received data is saved in the internal memory 313 of MFP1, and when the USB memory becomes attached state, it becomes possible to transfer to the USB memory the confidential received data stored in the internal memory. Thus, a recipient does not have to output the confidential received data as a printout, thus eliminating the risk of the received data being seen by a third person and ensuring high confidentiality. In addition, needless to say, since this is reception of confidentially transmitted data, authentication by means of a password, etc., similar to normal output of a printout, should take place if the data is transferred to the USB memory.

Although the embodiment as shown in FIG. 12 and FIG. 13 is the control wherein even when the USB memories 320 to 322 are not attached, confidential received data is once saved in the memory 313 of MFP1, and when attachment of at least any of the USB memories 320 to 322 is detected, transfer to the USB memories 320 to 322 takes place, as another embodiment, it is also possible that data reception in itself not take place unless at least any of the USB memory 320 to 322 is attached to MFP1 when confidential reception is executed.

Figure 14:
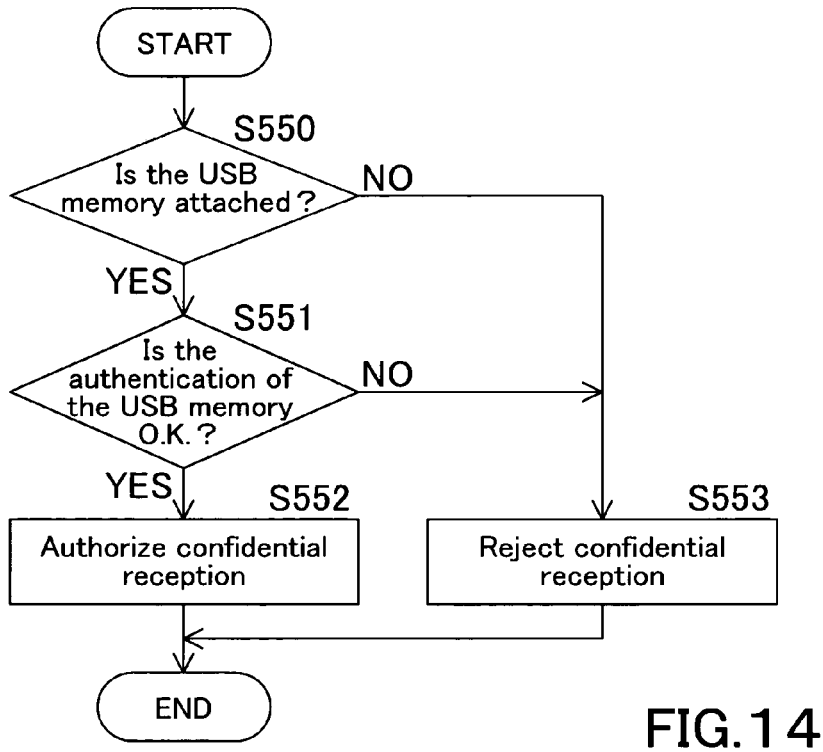
FIG. 14 is a flow chart showing determination processing of whether or not to authorize confidential reception.

FIG. 14 shows this process. First, in step S550, when confidential reception is executed, it is determined whether or not the USB memories 320 to 322 are attached. If it is determined that they are attached (YES in step S550), in step S551, it is determined whether authentication of the USB memory is correct. If the authentication is correct (YES in step S551), in step S552, confidential reception is allowed and the process is executed.

On the one hand, if the USB memories are not attached (NO in step S550) or if the authentication of the USB memory is not correct (NO in step S551), the confidential reception is rejected in step S553, and no process of the confidential reception is executed subsequently. In addition, if the reception has been rejected, a message that the reception has been rejected is notified to a transmitter of the confidential transmission.

Since also with the process as shown in FIG. 14, a recipient no longer needs to output the confidential received data as a printout, the risk of received data being seen by a third person can be eliminated, and thus high confidentiality can be ensured.

As we described one embodiment of this invention as above, this invention should not be limited to the above embodiment. For instance, although a multifunction compound machine was exemplified as a facsimile machine, it may be a single-function facsimile machine, and widely applicable to any devices having the facsimile function.

In addition, as we described regarding FIG. 14, security may be enhanced by providing the USB memories 320 to 322 with authentication capability (for confidential reception, in particular).

In other words, it is possible that USB memory itself serving as a key, permission to use transmission and reception in confidential transmission is switched. For instance, a code registered in the USB memory may be saved in a facsimile machine body (having database inside the body) and the control unit 311 functions as an authentication unit, and it becomes possible to detect and reveal who is a user. Of course, when USB for which a code has not been entered is used or when USB memory for which an unauthorized code has been entered is used, such a special function as confidential transmission and reception will be limited.

In addition, in confidential reception, it becomes apparent from an USB memory code who is a party, thus eliminating the need for setting a personal identification number. It is also possible to carry out double-checking by combining the authentication number and a code.

The following can be used as a key:

1. Those Using Hardware

As a method of switching enable/disable to various types of host machines (personal computers, MFP, facsimile machines, etc.), for instance, some hardware lock consisting of small hardware circuits (or a dongle, being a sort of hardware key to be used to prevent illegal copying of software programs) may be connected to the USB connection of the host machine.

If this hardware lock has been inserted into the USB jack prior to use of the facsimile machine, authentication by means of the hardware lock takes place when the facsimile machine is started, thus enabling subsequent use of the machine.

However, access to this hardware lock is not possible from an ordinary facsimile machine, not a memory. Thus, USB memory configuration coupling an ordinary flash memory unit that can read/write from/to the facsimile machine with a hardware lock unit for authentication provides a security-enhanced memory storage.

2. Something Using Software

As a method of having an USB memory without a circuit that can be hardware locked to store an authentication code for security, there is a method of using application software for writing an authentication code that runs on a personal computer. Use of this application software enables a specified code to be written to a specific area of the USB memory (such as boot area not accessible to the user, etc.).

If the USB memory is attached to the facsimile machine, the facsimile machine can check specific areas in the USB memories, and decide on subsequent operations, depending on presence or absence of an authentication code.

In addition, although we gave the description by using the USB memories as the external storage devices 320 to 322 in the above embodiment, it may be applicable to external storage devices such as a portable hard disk, an optical disk, a memory card, etc.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A facsimile machine comprises: a connection for connecting an external storage device; a detection unit for detecting whether or not the external storage device is connected to said connection; a switching unit that switches confidential fax transmitting function to enable when said external storage device is connected to said connector, and switches the confidential fax transmitting function to disable if it is not connected, a display unit for displaying names of files of image data that can be transmitted by facsimile, from image data stored in the external storage device connected to said connection; a file selection unit for selecting based on a user's instruction a file to be transmitted, among files displayed in said display unit, and a transmission unit for transmitting the image data of the file selected by said file selection unit by the confidential fax transmitting function.

2. The facsimile machine as recited in claim 1, further comprising:

a determination unit that determines based on a user's instruction whether or not to delete said data, after transmission of the image data of said external storage device completes; and a data deletion unit for deleting said data if it is determined to delete the data.

3. The facsimile machine as recited in claim 1, further comprising:
an authentication unit that authenticates whether or not the external storage device is an appropriate device which has been registered in advance, wherein said connection is loaded with the external storage device retaining information for authentication, and the external storage device is connected when said authentication unit authenticates that the external storage device is the appropriate device.

4. A facsimile machine comprises: a connection for connecting an external storage device; an internal memory; a detection unit for detecting whether or not the external storage device is connected to said connection; a receiving unit for receiving image data by confidential fax; a saving unit that saves into said internal memory image data of the received confidential fax if said external storage device is not connected to said connection; and a transfer authorizing unit that enables transfer to said external storage device of the received data of the confidential fax stored in said internal memory when said external storage device is connected to said connection.

5. The facsimile machine as recited in claim 4, further comprising:
an authentication unit that authenticates whether or not the external storage device is an appropriate device, wherein said connection is loaded with the external storage device, and said detector detects whether or not the external storage device is connected after said authentication unit authenticates that the external storage device is the appropriate device.

6. The facsimile machine as recited in claim 4, wherein the external storage device is an USB memory.

7. The facsimile machine as recited in claim 6, wherein the USB memory is provided with authentication capability, and is connected when it is authenticated with the facsimile machine that it is an appropriate memory.

8. A facsimile machine comprises: a connection for connecting an external storage device; a detection unit for detecting whether or not the external storage device is connected to said connection; a switching unit that switches confidential fax reception function to enable if said external storage device is connected to said connection and switches the confidential fax reception function to disable if it is not connected; a receiving unit for receiving image data of the confidential fax; and a saving unit that saves into said external storage device the image data of the received confidential fax.

9. The facsimile machine as recited in claim 1, wherein the external storage device is an USB memory.

10. The facsimile machine as recited in claim 9, wherein the USB memory is provided with authentication capability, and is connected when it is authenticated with the facsimile machine that it is an appropriate memory.

11. The facsimile machine as recited in claim 8, wherein the external storage device is an USB memory.

12. The facsimile machine as recited in claim 11, wherein the USB memory is provided with authentication capability, and is connected when it is authenticated with the facsimile machine that it is an appropriate memory.

13. A method of transmitting a facsimile using a facsimile machine having a confidential fax transmitting function and equipped with a connection for connecting an external storage device, a display unit, and an input portion, the method comprises the steps of:
detecting whether or not said external storage device is connected to said connection;
switching said confidential fax transmitting function to enable when said external storage device is connected to said connection, and switching the confidential fax transmitting function to disable when it is not connected;
displaying names of files of image data that can be transmitted by facsimile, from image data stored in the external storage device connected to said connection on said display unit;
selecting, based on a user's instruction by said input portion, a file to be transmitted from displayed files; and
transmitting the image data of the selected file by the confidential fax transmitting function.

14. The method of transmitting a facsimile as recited in claim 13, further comprising the steps of:
determining based on a user's instruction whether or not to delete said data after transmission of the image data of said external storage device completes; and deleting said data if it is determined to delete the data.

15. A method of receiving a facsimile using a facsimile machine having a confidential fax receiving function and equipped with a connection for connecting an external storage device, and an internal memory, the method comprises the steps of:
detecting whether or not said external storage device is connected to said connection;
receiving image data of a confidential fax by said confidential fax receiving function;
saving the received image data of the confidential fax into said internal memory, when said external storage device is not connected to said connection; and
authorizing transfer to said external storage device the received image data of the confidential fax stored in said internal memory, when it is detected that said external storage device is connected to said connection.

16. A method of receiving a facsimile using a facsimile machine having a confidential fax receiving function and equipped with a connection for connecting an external storage device, and an internal memory, the method comprises the steps of:
detecting whether or not said external storage device is connected to said connection;
switching said confidential fax receiving function to enable when said external storage device is connected to said connection, and switching the confidential fax receiving function to disable when it is not connected;
receiving image data of a confidential fax by said confidential fax receiving function; and
saving into said external storage device connected to said connection the image data of the received confidential fax.

17. The method of receiving a facsimile as recited in claim 16, further comprising: an authentication step for authenticating whether or not the external storage device is an appropriate device, wherein said connection is loaded with the external storage device, and the connecting of the external storage device is detected after said authentication step authenticates that the external storage device is the appropriate device.

* * * * *